Dec. 4, 1934.          LA VERNE C. STURGIS          1,983,055
              METHOD OF AND APPARATUS FOR HATCHING EGGS
                    Filed July 20, 1927          4 Sheets-Sheet 1
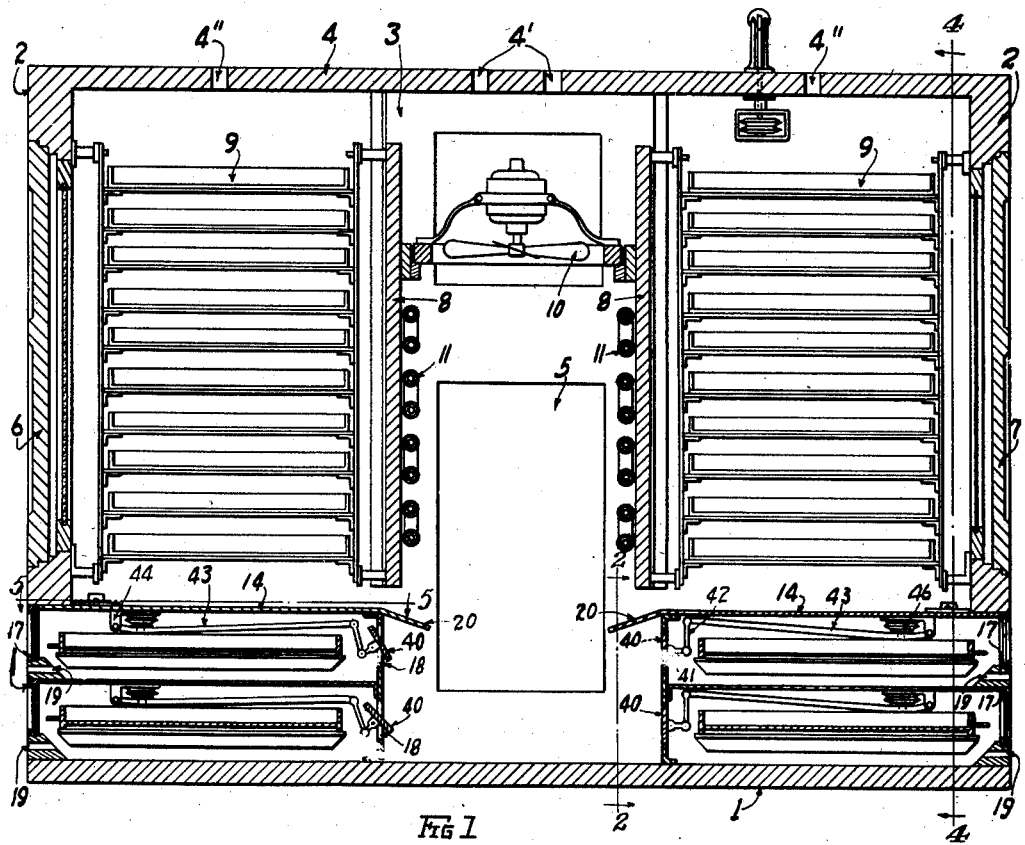
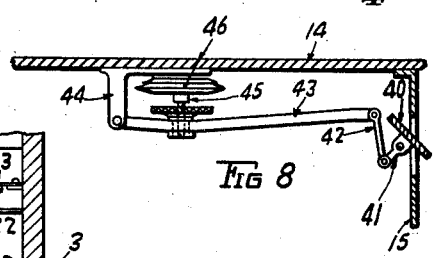
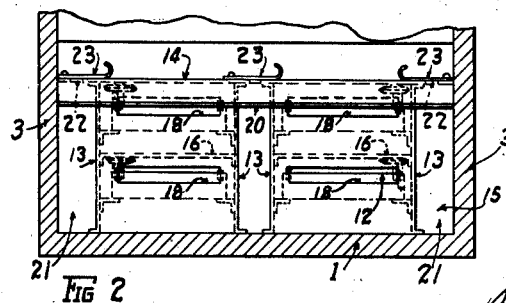
INVENTOR.
La Verne C. Sturgis
BY
ATTORNEYS.

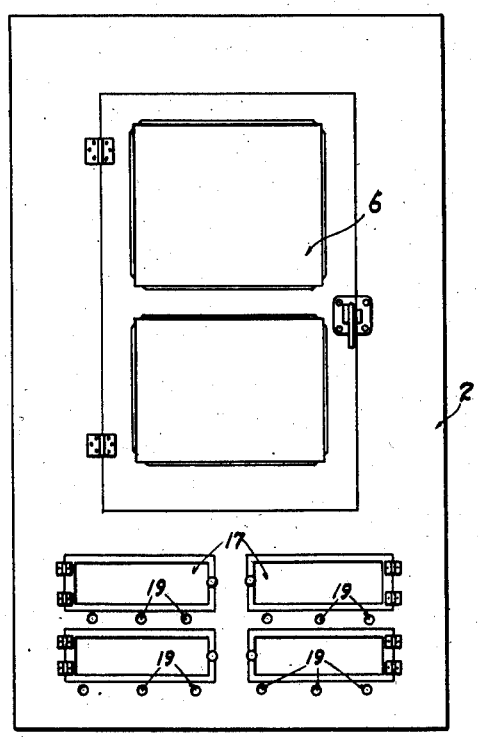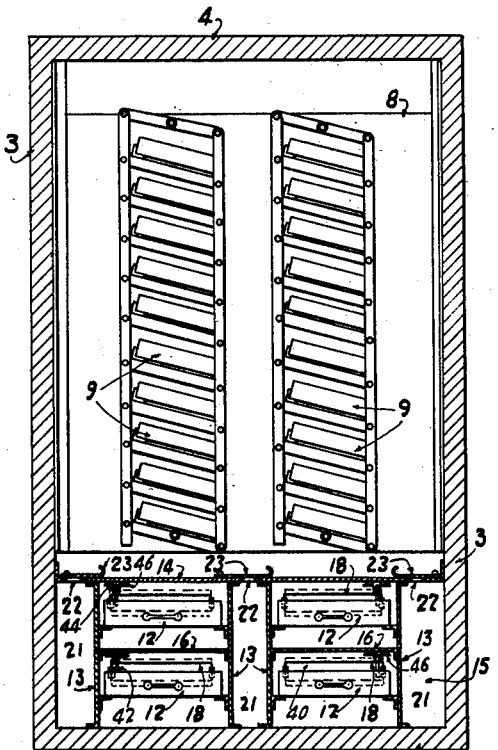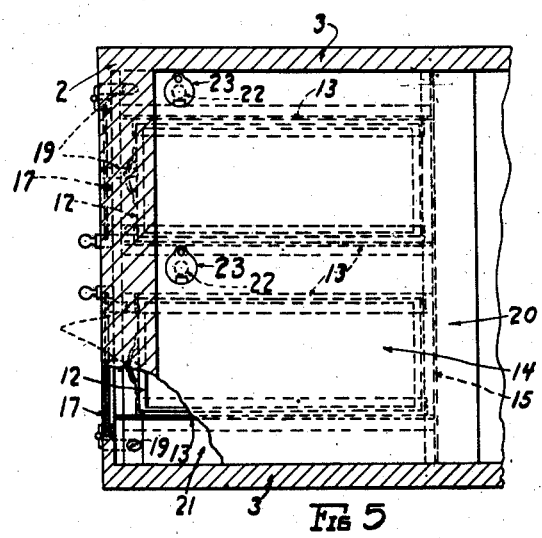

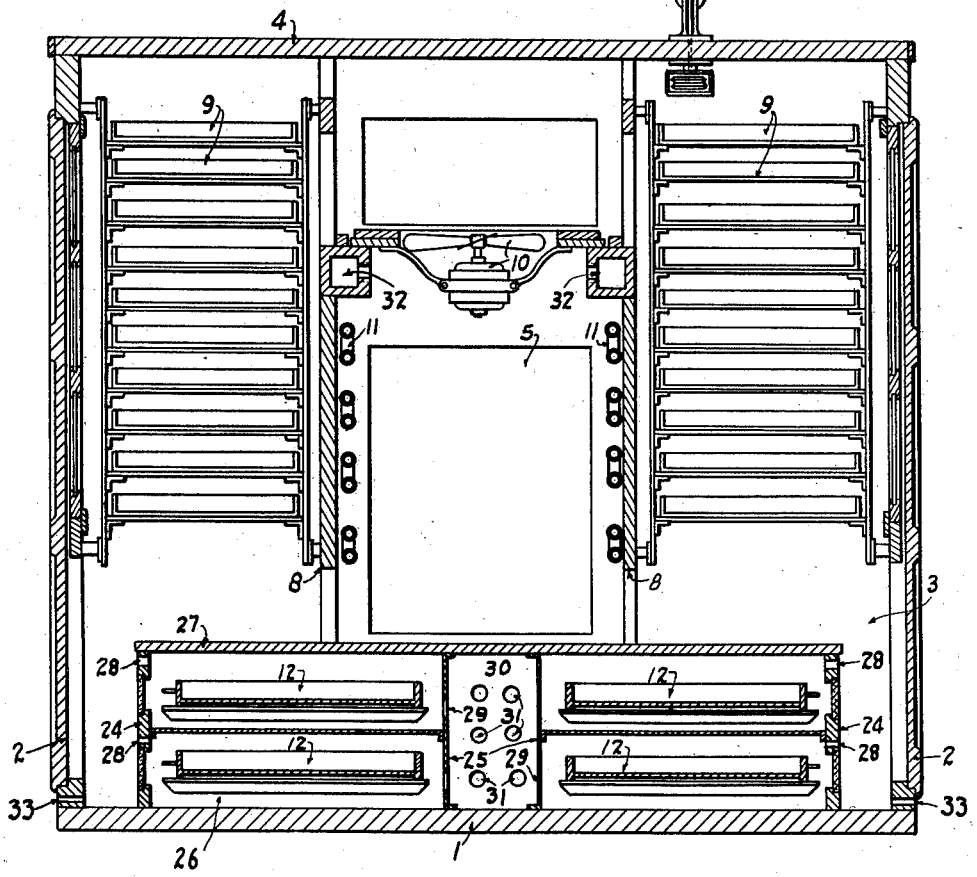

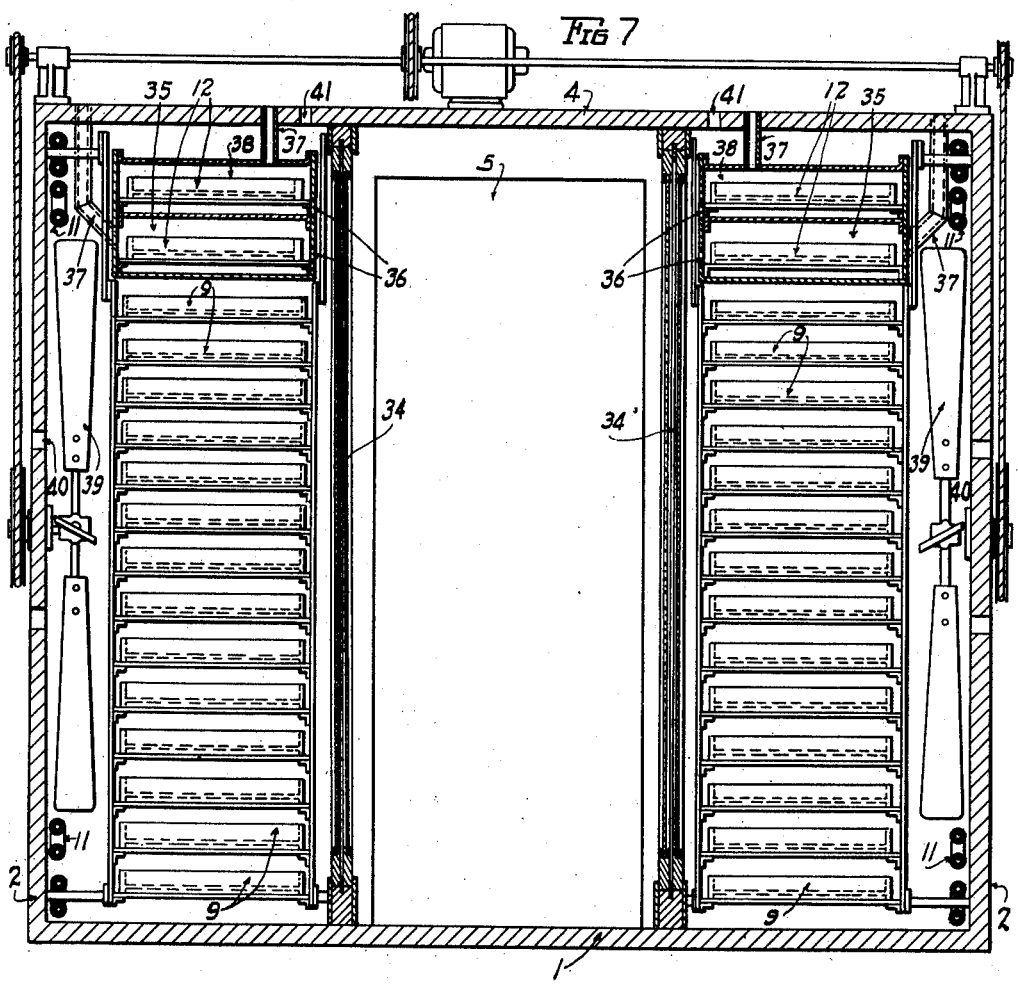

Patented Dec. 4, 1934

1,983,055

UNITED STATES PATENT OFFICE

1,983,055

METHOD OF AND APPARATUS FOR HATCHING EGGS

La Verne C. Sturgis, Springfield, Ohio, assignor, by mesne assignments, to The Buckeye Incubator Manufacturing Company, Beachwood, Ohio, a corporation of Ohio Application July 20, 1927, Serial No. 207,267

10 Claims. (Cl. 119—35)

This invention relates to an improved method of and apparatus for hatching eggs, the invention relating more particularly to that type of incubator in which the eggs are arranged in different stages of incubation, with provision for supplying heated air from a common source to all of the eggs.

In incubators of this type it has been the practice to arrange the trays containing the eggs in series, usually in a vertical direction, with the eggs in different stages of incubation. It has also been the practice to subject the eggs to heated air from a common source, which in some incubators is circulated by the action of a fan in a well defined path over the eggs while in other incubators the air is agitated by a fan or paddle which causes it to circulate freely through the eggs. In all arrangements, however, the air is supplied to all of the stages of the eggs, as a result of which the temperature of the air and quantity of fresh air is not always best suited for all the different stages of incubation, and, further, there is the objectionable feature that down and other matter from the newly hatched chicks in the hatching trays are carried by the air to the other hatching trays as well as to the trays of eggs in the earlier stages of incubation so that if any of the newly hatched chicks are diseased, this disease is spread by reason of the fact that the disease germs are carried on the down or otherwise to other chicks. Another objectionable feature in connection with the down is the fact that when the doors leading to the egg trays are open, the down is blown outwardly in an annoying manner into the face of the operator.

An object of this invention is to provide a method and apparatus whereby eggs in one stage of incubation are so separated from eggs in other stages of incubation that an independent supply of air may be furnished to that stage from a common source of supply and regulated to the desired degree of temperature and quantity best suited for that particular stage.

A further object of this invention is to provide a method and apparatus for carrying out the method such that each tray of eggs in the stage of hatching is so separated from each other hatching tray and also from the trays of eggs in the earlier stages of incubation that a supply of air is applied independently to each hatching tray; a further object in this connection being to so discharge the air from each hatching tray as to prevent returning that air to the air which is applied to the other hatching trays or to the eggs in the earlier stages of incubation so that the down or other matter from the chicks in the hatching trays is effectively prevented from finding its way to other hatching trays or to the other incubating trays.

A further object of my invention is to provide means for independently controlling the temperature of the compartments so that a proper temperature may be maintained in each compartment regardless of the number of eggs therein.

In the accompanying drawings:

Fig. 1 is a vertical section of an apparatus for carrying out my improved method.

Fig. 2 is a section on the lines 2—2 of Fig. 1.

Fig. 3 is a side elevation.

Fig. 4 is a section on the lines 4—4 of Fig. 1.

Fig. 5 is a section on the line 5—5 of Fig. 1.

Fig. 6 is a vertical section of an incubator showing a modification in the manner of the air circulation and in the arrangement of the hatching trays.

Fig. 7 is a vertical section of another modified form of incubator with my invention applied thereto.

Fig. 8 is a detail of one of the thermostatic controlling devices for the hatching trays.

Referring first to Figs. 1, 2, 3, 4 and 5 of the drawings, there is shown an incubator of the large capacity type in which the warm air is circulated in an upward direction through the eggs in the process of incubation. The apparatus is enclosed in a room-like structure in which 1 represents the bottom, 2 the sides, 3 the ends and 4 the top or roof, each end being provided with a door 5 to furnish access to the central corridor and the sides being provided with double doors 6 and 7 to furnish access to the egg trays. In the present incubator there are provided two division walls 8 to divide the structure into a central corridor and two side egg compartments. Each egg compartment has arranged therein a series of egg trays 9 in which are arranged eggs in different stages of incubation. The air is circulated by a fan 10 downwardly through the central corridor and thence upwardly through the respective series of egg trays, the air being warmed in the usual way by a series of heating coils 11. Fresh air is supplied through restricted openings 4' and discharged through openings 4'' in the usual way.

In the present case I have shown only the eggs in the last or hatching stage separated from the eggs in the other stages, but the invention contemplates the complete separation of any other stage or any or all of the stages so far as a supply of air for maintaining a predetermined temperature in each compartment, or a predetermined quantity of air to each compartment, is concerned. Instead of having the hatching trays forming a part of the series of trays containing the eggs in the earlier stages of incubation, with the same air applied to the eggs in all of the trays, the hatching trays are located in separate compartments and provision is made for circulating air from the central corridor through these compartments and discharging it to atmosphere. The hatching trays are indicated at 12, there being shown in the present case two of these trays beneath each series of trays 9, there being in the present apparatus two series of the trays 9 on each side of the incubator as shown in Fig. 4. Each hatching tray is located in an independent compartment, these compartments being formed by side walls 13, a top 14, an inner wall 15, and horizontal intermediate walls 16, preferably formed of sheet metal, the lower edges of the side and end walls being secured to the bottom 1 of the main structure which serves to enclose the bottom of these compartments. Access is secured to the hatching trays through doors 17 in the side walls 2, these doors serving as enclosures for the outer ends of the compartments. The inner wall 15 of each compartment has an elongated opening 18, which forms inlets for the air from the central corridor, and leading from each portion of each compartment are openings 19 formed in the side wall 2, there being shown in the present case three of these openings for each chamber which act as outlets to permit the air to escape to atmosphere. Each inlet 18 is controlled by a damper 40 on one arm of a pivoted lever 41, which lever is pivotally connected by a link 42 with one end of a lever 43, the other end of which is pivoted to a bracket 44. The lever 43 is connected with a stem 45 of the thermostat 46 of a well known type, located in the corresponding hatching tray compartment. As the number of eggs in the hatching trays vary, due to various causes, the quantity of air supplied to the various compartments containing these eggs should correspondingly vary to furnish a proper temperature, and the equipment of each compartment with an independent thermostatically controlled valve responsive to the temperature of that compartment enables the temperature of each compartment to be accurately regulated. It should be explained in this connection that the eggs in the last or hatching stage of incubation, due to the natural animal heat of these eggs, require air at a temperature several degrees lower than that supplied in the earlier stages of incubation.

Each division wall 8 terminates at a point removed from the floor 1 a sufficient distance to allow air to circulate between the same and the hatching tray compartments to the trays 9, a deflector 20 projecting inwardly from the upper ends of each compartment being preferably provided to assist in directing the air to the trays 9 and 12. However, in order that there may be no dead space or lack of warm air for the outer ends of the lowermost trays 9, the hatching tray compartments are spaced from each other and also from the ends 3 of the main structure so as to provide passageways 21 leading from the lower part of the central corridor, which passageways are closed at the top by the metal sheet which forms the tops 14 of the hatching tray compartments excepting that those portions of the outer edge of this metal sheet which are in line with the passages 21 are cut away to provide outlets 22 which are controlled by pivoted valves 23 for the purpose of securing proper circulation.

In operation, the major portion of the air circulates upwardly through the trays 9 containing the eggs in the earlier stages of incubation, part of the air, however, entering through the openings 18 into the compartments containing the eggs in the process of hatching and escaping through the discharge openings 19 to outside atmosphere. The air which circulates through the trays 9 not only passes to those trays through the spaces above the deflectors but also through the passageways 21 and openings 22, this latter air circulating through the space occupied by the outer portions of the trays 9 so as to insure a uniform temperature being maintained throughout the entire length of the lower trays, this latter amount of air being regulated by the valves 23. By this arrangement it will be seen that there is no opportunity for the down from the newly hatched chicks being carried from one hatching tray to another hatching tray, or into the air circulation in the main compartment so that the trays 9 will therefore be free from down and the danger eliminated of disease germs being deposited on the eggs and communicated to the chicks subsequently hatched from those eggs, as well as being carried to new hatched chicks in other hatching trays. Further, the annoyance of down blowing into the face of the operator when opening the doors leading to the incubating trays is likewise obviated.

In Fig. 6 the invention is shown applied to an incubator in which the air circulation is reversed; that is, in which the air circulates downwardly through the trays 9 and upwardly through the central corridor. The compartments containing the hatching trays 12 are shown formed of outer walls 24 and inner walls 25, end walls 26 and a top covering 27 which extends over the entire series of hatching tray compartments. The outer walls 24 are spaced from the side walls of the main chamber and provided with inlet openings 28. The inner walls 25 have discharge openings 29 which discharge into a longitudinally-extending conduit 30 formed by the inner walls of the compartments, the top covering 27, the bottom of the main chamber, and the end walls 3 of the main chamber. The end walls of the main chamber are provided with discharge openings 31 leading to outside atmosphere. In this incubator the air is supplied to the main chamber through the conduits 32, which communicate with outside atmosphere, and is allowed to discharge through restricted orifices 33 at the bottom of the side walls 2. In this construction, no provision is shown for the circulation of air between the hatching tray compartments, but such an arrangement may be employed if found desirable, as in the case of the incubator shown in Figs. 1 to 5 inclusive.

In Fig. 7 the invention is shown applied to an incubator in which the air is kept in motion among the eggs by an agitating or stirring operation. The trays 9 for the eggs in the different earlier stages of incubation are located in closed compartments formed by the walls of the main chamber and by parallel sliding doors 34, while the hatching trays 12 are each located in a separate compartment 35 and 38 at the upper end of each series of incubating trays. The inner side of each of the hatching tray compartments has a series of inlet openings 36 while small discharge pipes 37 lead therefrom through the top of the inculating chamber to outside atmosphere. A stirrer or agitator having blades 39 is located adjacent each side of the incubating chamber and keeps the air in motion through the entire series of incubating trays, warm air from the hatching trays finding its way through the openings 36 and escaping to outside atmosphere through the pipes 37. In this machine the inlet openings for fresh air are indicated at 40 and the escape openings for foul air at 41.

In connection with the modifications shown in Figs. 6 and 7 no thermostatic control of the temperature of the hatching compartment has been shown, but it will be understood that the same thermostatic control described in connection with the apparatus shown in Figs. 1 to 5 inclusive will be employed in connection with the modifications.

Having thus described my invention, I claim:

1. The method of hatching eggs consisting in arranging eggs in different stages of incubation in a closed chamber, with the eggs in the stage of hatching arranged in a separate compartment in said chamber located beneath the eggs in the earlier stages of incubation, supplying warm air from a common source to all of said eggs, and circulating the warm air which is applied to the eggs in the earlier stage of incubation in an upward direction through said eggs by causing it to pass above and about the sides and outer ends of said hatching compartment.

2. In an apparatus for hatching eggs, a main chamber, an upper compartment in said chamber for the eggs in the earlier stages of incubation open at the top and bottom, means for creating a circulation of air upwardly through said compartment, and a lower compartment for the eggs in the stage of hatching located below the open end of said first compartment and spaced therefrom, said lower compartment having air inlet and discharge openings, there being also provided air passage-ways leading from the lower portion of said main chamber about the sides and inner end of said lower hatching compartment and communicating with the lower open end of said upper compartment.

3. In an incubator, a main chamber having egg trays arranged in series therein with means for heating and circulating the air in said chamber and about said trays, a separate hatching compartment within said chamber having a thermostatically controlled inlet from said main chamber to said hatching compartment to admit a portion only of the air from said main chamber and an outlet for discharging the air from said hatching compartment without returning the same to said main chamber.

4. In an incubator, a main chamber having egg trays arranged in series with means for heating and circulating the air through said eggs, a plurality of separate hatching compartments arranged in the lower part of said chamber, each of said hatching compartments having an inlet communicating with said main chamber whereby a portion only of the warm air may be supplied to said hatching compartments from said main chamber, thermostatic means for controlling said inlet, and means for discharging the air from said hatching compartments without returning the same to said main chamber.

5. The method of incubating and hatching of eggs which consists in arranging eggs in trays in the main chamber, heating and moving the air in said chamber and about said trays, placing the eggs in the hatching stage in a compartment and causing only a portion of the moving air to pass through the compartment without returning to said main chamber.

6. In an incubator, a chamber, means to cause the air in the chamber to circulate down the center and up the sides of the chamber, and a separate compartment in the chamber having an inlet in the path of the circulating air and an outlet to the outside of the chamber.

7. In an incubator, a chamber, means to heat and cause the air in the chamber to circulate down the center and up the sides of the chamber, a pair of spaced separate compartments in the chamber, each compartment having an inlet in the path of the circulating air and an outlet to the outside of the chamber, and thermostatic means in each compartment to regulate the inlet thereof.

8. In an incubator, a chamber, means to heat and cause the air in the chamber to circulate down the center and up the sides of the chamber, a separate compartment in the chamber having an inlet in the path of the circulating air and an outlet to the outside of the chamber, and thermostatic means in the compartment to regulate the inlet.

9. In an incubator, a chamber, a plurality of separate compartments at each side of the chamber, each compartment having an inlet in the chamber and an outlet to the outside of the chamber, means to warm the air in the chamber, means to cause the warm air to circulate by the inlets, and thermostatically operated means in each compartment to regulate the inlet thereof.

10. In an incubator, a chamber, a separate compartment at each side of the chamber having an inlet in the chamber and an outlet to the outside of the chamber, means to warm the air in the chamber, means to cause the warm air to circulate by the inlets, and thermostatically operated means to regulate the inlets, said means including dampers adapted to direct a part of the circulating air through the inlets.

LA VERNE C. STURGIS.